INVENTOR.
JOHN A. DRAXLER
BY Golrick + Golrick
Atty's.

June 6, 1961   J. A. DRAXLER   2,987,205
SIDE LOADING DIE TRUCK
Filed April 9, 1958   4 Sheets-Sheet 2

INVENTOR.
JOHN A. DRAXLER
BY
Gohrick & Gohrick
Atty's.

June 6, 1961 J. A. DRAXLER 2,987,205
SIDE LOADING DIE TRUCK
Filed April 9, 1958 4 Sheets-Sheet 3
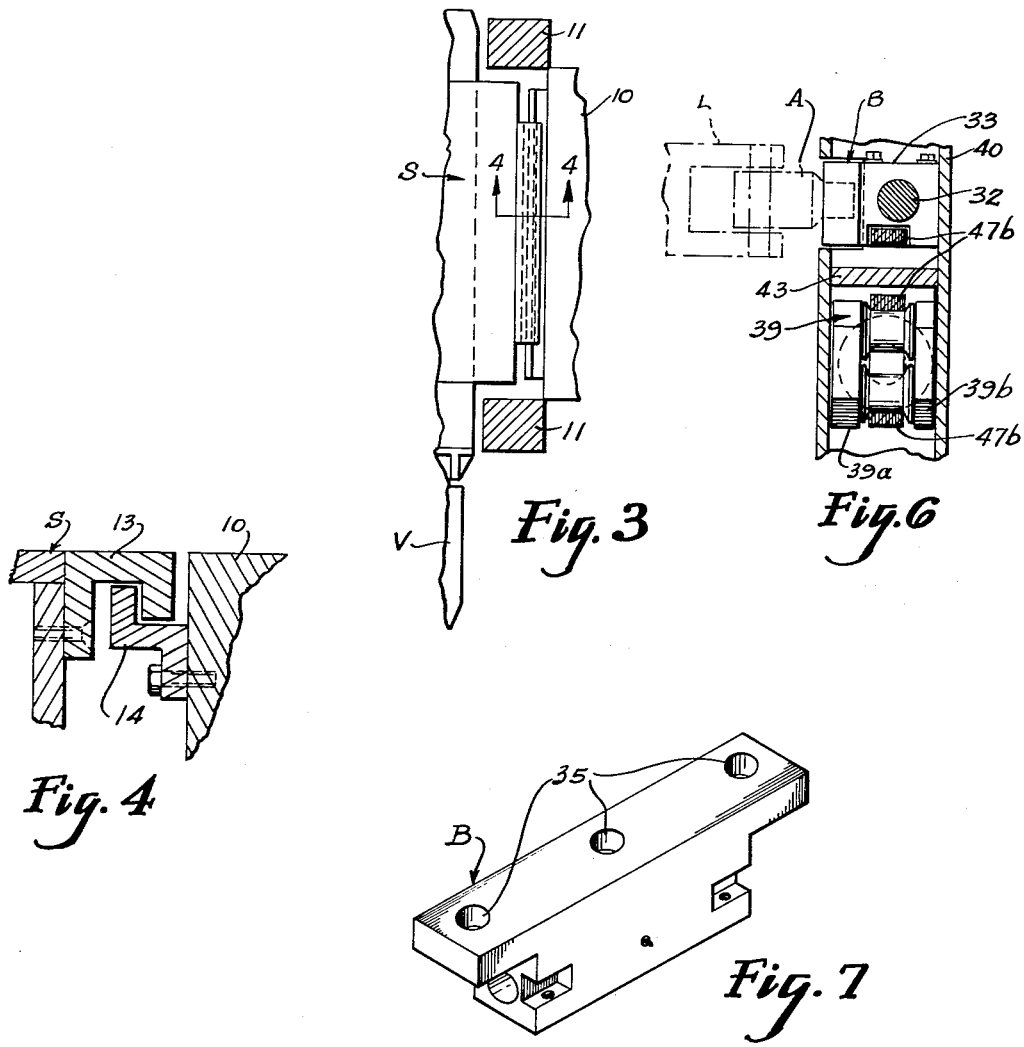
INVENTOR.
JOHN A. DRAXLER
BY
Golrick & Golrick
Atty's.

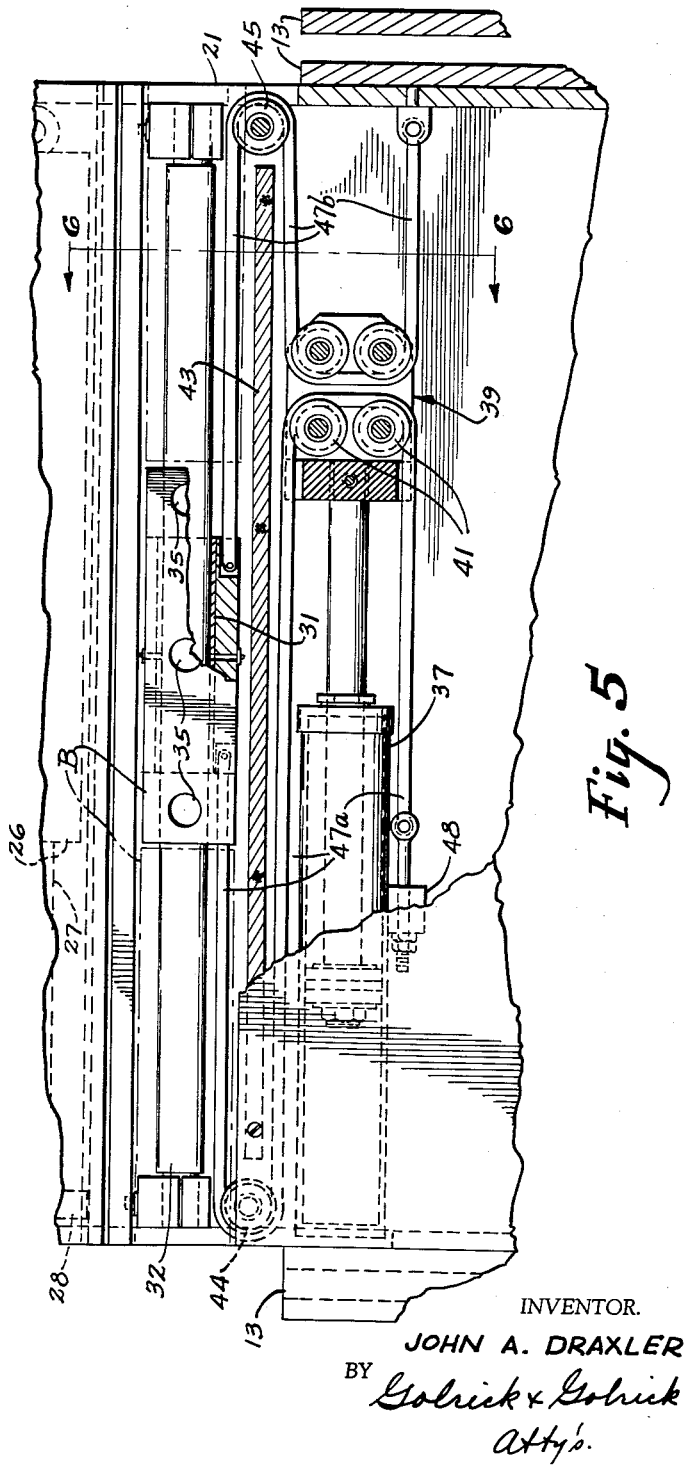

United States Patent Office 2,987,205
Patented June 6, 1961

2,987,205
SIDE LOADING DIE TRUCK
John A. Draxler, Berea, Ohio, assignor to The Elwell-Parker Electric Company, Cleveland, Ohio, a corporation of Ohio
Filed Apr. 9, 1958, Ser. No. 727,462
5 Claims. (Cl. 214—730)

The present invention is concerned generally with a side loading industrial truck and more particularly with an industrial lift truck adapted to loading and unloading heavy loads such as large dies sidewise of the load platform. In view of the particular utility of a truck of this invention in handling large, heavy dies it will be described in terms of such dies; but it is to be understood that the invention may have utility as well for loads of other types, particularly rigid loads.

End loading die trucks of the prior art have had the advantage that the truck can be readily maneuvered to approach the opening of a press end-wise and to bring the end of the die carrying platform of the truck up against or at least very close to the press bed, so that translation of the load from truck to bed, or reversely, can be accomplished conveniently and without setting up any external gap-bridging structure. However, in many circumstances because of relatively narrow aisle space, the maneuvering of an end loading truck for proper approach is awkward; and, were narrow space-saving asiles to be used, as is often desirable in plant layout, maneuvering of an end loading truck would be impossible. For these reasons an otherwise acceptable side loading truck would have decided utility.

In the case of the side loading truck a recognized objection has been the inability of the truck to be so maneuvered as to bring the load platform into immediate proximity with a press bed. This limitation arises because in the usual environment a pair of posts or columns at each side of and forward of the press bed, in conjunction with the length of the vehicle prevents maneuvering of the load carrying portion of the truck into side-wise proximity with the bed in contrast with the end-on close approach possible with the end loading truck. The consequence of such limitation is that the gap remaining between the press bed and truck platform, often as much as 12 or more inches, in many cases would have to be bridged by a temporary external structure set up under conditions so awkward as to be an unacceptable expedient from considerations of safety, labor and time involved.

By the present invention there is provided a side loading truck, the load carriage platform of which includes a load bearing panel or section laterally shiftable into proximity with the press bed, thereby bridging a gap otherwise present. The shiftable section includes force applying means for shifting of a die thereon relative to the section itself, whereby the die can be initially shifted transverse to the platform space toward an external load situs or bed by movement of the load supporting section itself, which simultaneously comes into a position bridging say the gap between the nonshiftable part of the platform and a press bed; and then by operation of the load shifting means included in the shiftable section, the die may be further moved relative to the section into the press. For loading a die into the platform space of the truck the side shiftable section of course again serves to bridge the gap in question, the said force applying means being adapted to use for drawing a die out of the bed. Thus the prime objection to a side loading truck is obviated while its advantages are retained.

In the specific form in which the invention is hereinafter disclosed in an industrial truck of known form the vertically movable lift platform is provided with a laterally shiftable central panel, elevated say about one-fourth inch above the fixed adjacent horizontal top surfaces of the platform so that the panel or section alone immediately bears the die load. The panel is mounted in a slide-way to be shifted to either side of the platform, say fifteen inches outboard with a platform width of sixty inches, by motor means such as double acting hydraulic cylinder means simultaneously acting on the front and rear of the panel or section. In a pair of parallel spaced slots extending across the panel, movable blocks are supported on slide bars, preferably with no part of the blocks projecting above the die supporting surface, in which case removable upwardly projecting abutment elements are carried by the blocks. As motor means for the blocks, double-acting hydraulic cylinder units with motion multiplying connections to the blocks are carried in the shiftable section below its top surface.

Thus the shiftable section may be brought to the level of a press bed or die storage site, any gap between the platform and external site bridged, and the die moved onto or off of the truck by engagement of abutment elements with the die directly, through extension pusher means, through draw cable means secured to abutments and die, or sequentially used combinations of such means, as will be more fully described.

Further the die-bearing shiftable section and the external site or sites of concern in die manipulating operations are advantageously furnished with cooperating elements forming anchor or latch means, locking the truck and external environmental structures together. In such manner the truck may serve to stabilize a die storage rack during die movements relative thereto; or engagement with a press bed will prevent the truck itself from shifting sideways.

The general object of the present invention is then to overcome objections to a side loading industrial truck for heavy loads such as large dies. Another object is the provision of a side loading die truck incorporating means for bridging a marked gap between the truck platform and an external site. A still further object is the provision in an industrial truck of means adapted for safely and conveniently shifting a heavy load such as a die laterally to or from an external site. A still further object is the provision in a side-loading industrial truck of latching means for a stabilizing engagement with external environmental structures relative to which a load is to be shifted.

Other objects and advantages will appear from the following description and the drawings wherein:

FIG. 3 is a fragmentary plan outline indicating the relation of a truck of this invention to an external site, such as a press, with respect to which a load is to be shifted, with latching elements exaggerated for clarity of representation;

FIG. 4 is a detail sectional view of the latching means taken at 4—4 in FIG. 3;

FIG. 5 is a plan detail view of force applying means for laterally shifting a load such as a die relative to a laterally shiftable load supporting section or panel of the truck load platform;

FIG. 6 is a sectional view taken substantially as indicated by 6—6 in FIG. 5; and FIG. 7 is a detail of an abutment carrying shifting block appearing in FIG. 5.

Figure 1:
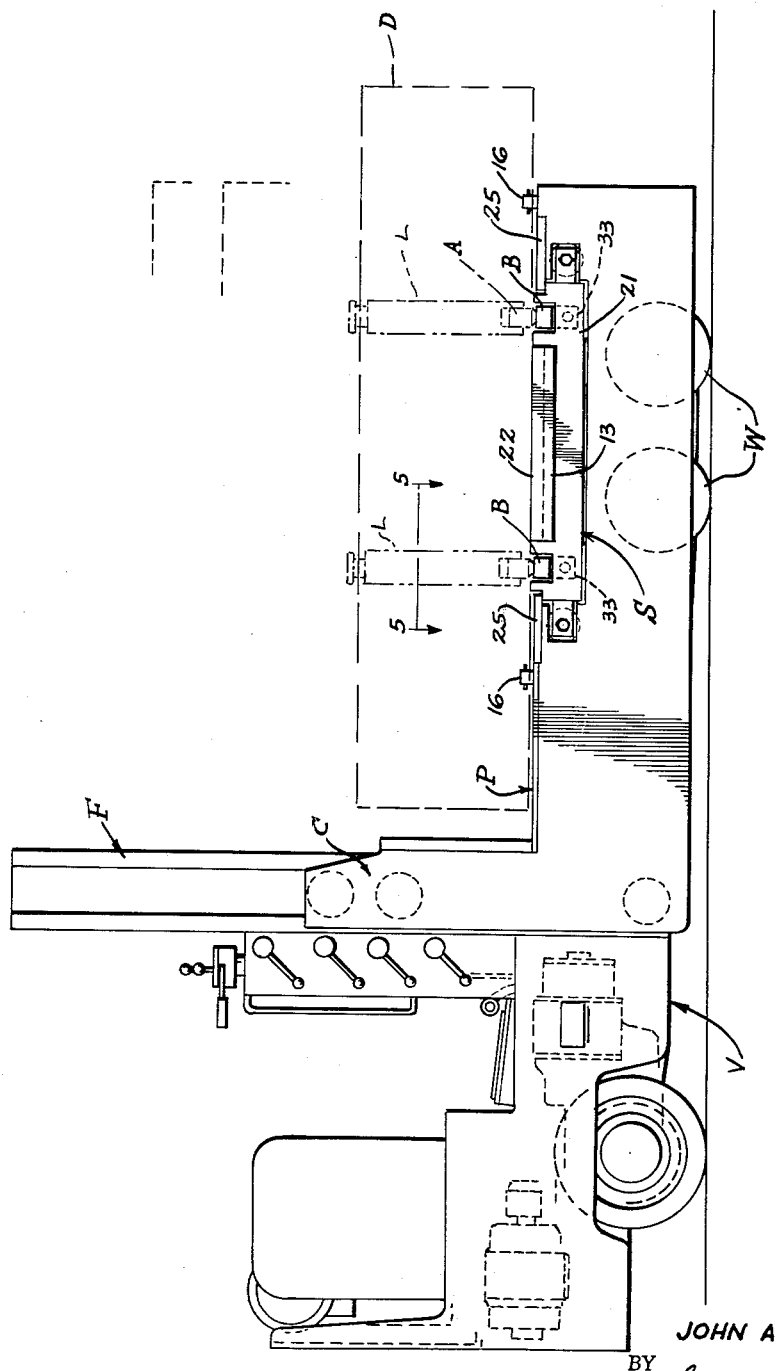
FIG. 1 is a side view of a truck embodying the present invention.

In FIG. 1 of the drawings there is represented in solid lines an industrial truck comprising a known self-propelled dirigible vehicle frame V, an elevator carriage C vertically movable on an upright elevator frame F fixed to the vehicle frame, and a platform structure P projecting forwardly from the carriage. The means of raising and lowering the carriage relative to the elevator frame, the particular structure of the latter, the vehicle structure, steering and propulsion may be any of those now well known to the art. By dashed outline D there is represented a die load of typical large dimensions for the truck structure disclosed in the drawings.

Incorporated in the generally horizontal platform structure is a laterally shiftable horizontal platform section or panel S serving to support directly the load D, and therefore raised slightly, say ¼ inch, above the adjacent horizontal non-shiftable parts of the platform P. Near the front and rear edges of the laterally shiftable structure S, there are disposed in like trackways, preferably independently shiftable blocks B (see FIGS. 5 and 7) the top surfaces of which are preferably at or below the level of the top horizontal surfaces of shiftable platform S. Each block has a plurality of spaced axially vertically disposed apertures for selected reception in each block of an abutment or post A carrying a pivotally connected load pusher arm L. (See FIGS. 1 and 6). Conveniently arm L are removably pinned to posts A. At this point it may be here noted that preferably the shiftable section S is in longitudinal sense located over the underlying paired forward sets of wheels W.

Figure 2:
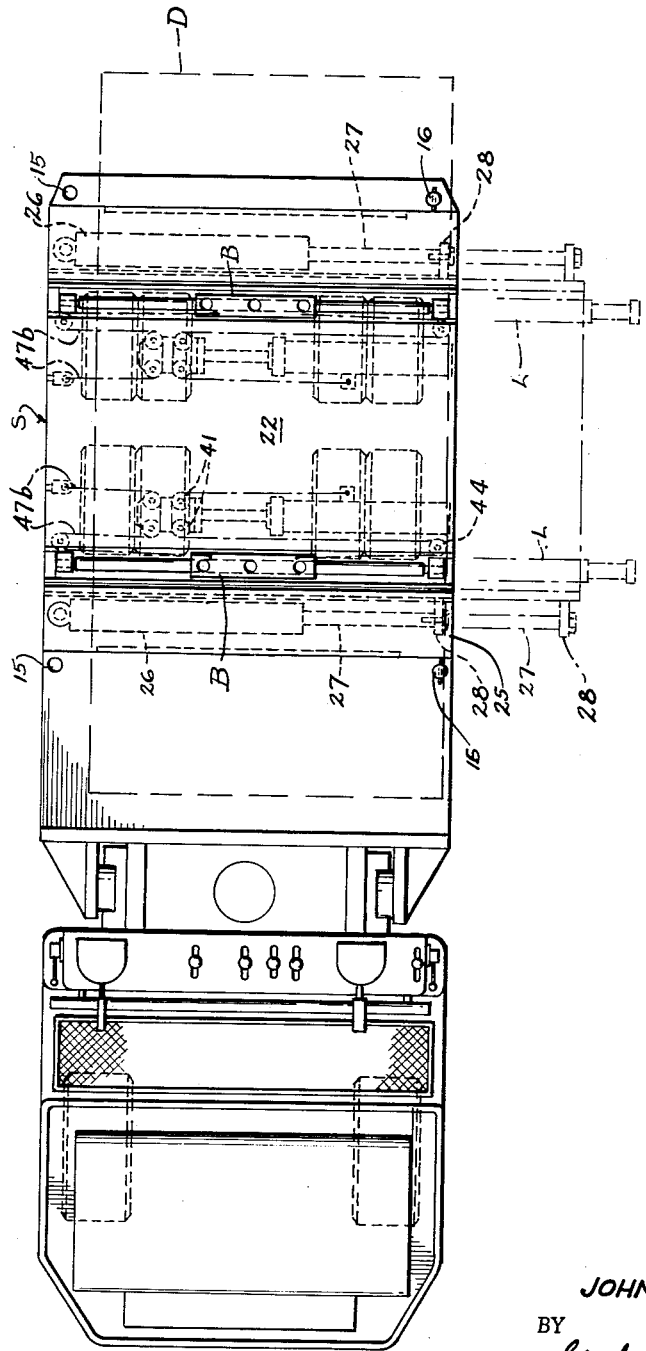
FIG. 2 is a top plan view corresponding to FIG. 1.

Considering now FIGS. 3 and 4 in conjunction with FIGS. 1 and 2 for lateral transfer of a die load, the side loading truck by normal vehicle operation is brought up parallel to the rack, or as indicated in outline FIG. 3 to the press, having an external load supporting surface 10, such as a press bed. In consequence of external structure, for example pillars, posts or columns 11, the fixed platform P cannot be brought into immediate juxtaposition to the external bed 10, resulting in a gap between the fixed platform area of the truck and the press bed. With the present invention however, the actual die supporting surface of S may be shifted laterally as indicated in FIG. 3 to bridge such gap.

It should be noted that the latching elements 13, 14 are exaggerated in FIG. 3 for clarity of representation, and that actually the surface S would approach the bed 10 relatively much more closely, even with such latch means present. Absent such latch means, and of course within the extension limits of S, the latter may be brought quite close to 10. Such latch means here includes an inverted channel-like member 13 affixed to a lateral skirt, margin or edge of shiftable structure S and forming a local continuation of the load supporting surface. Member 13 may then be engaged with an upwardly extending element of the environment, such as Z-section 14 secured on the front of the press-bed (or other external load locus), by elevating the carriage C so that channel 13 clears 14, extending structure S, and lowering into the relation of FIG. 4. The consequent interlocking prevents any notable separation of the vehicle and such external load locus, as by vehicle shifting when the load is drawn onto or pushed from the vehicle relative to a press-bed; or undue strain upon die storage racks, in transfer of a die load relative thereto. Likewise abutting of the laterally shiftable assembly and the external locus will prevent relative shifting of the same toward each other. Accordingly, danger of damage to auxiliary press structures or vehicle is minimized in the case of loading or unloading relative to, say, a press bed; or to storage racks in the case of similar operations relative thereto.

Before detailed description of mechanism, considering now the character and utilization of the vehicle thus far described in rather broad functional relations, it may be observed that a die load may be moved to either side of the vehicle by shifting of structure S; and further, that the load may be shifted relative to the load supporting surface of structure S by the corresponding movement of blocks B, hence abutments A and arms L, relative both to S and to the vehicle as a whole. Also, where both side margins of the fixed portions of the platform, fore and aft of the shiftable structure S, are provided with vertical apertures as at 15 to receive removable cable anchor pins or posts 16 (appearing only on the right side of the vehicle), conveniently posts A with arms L removed, the load may be secured by cable means to pins 16 and panel S moved to effect a shifting of the load relative to S.

Where a die is to be withdrawn from a press bed 10 (or storage rack) the vehicle may be brought into the position of FIG. 3 with the load supporting surface of S level with the bed 10. Assuming the die load to be at the edge of the fixed external load supporting surface, the blocks B are shifted toward the die load, the die load is lashed to the posts or abutments A in the blocks B, and by simultaneous movement of blocks B, the die is drawn at least partially onto the platform. If the die is then suitably located relative to S for transport to another place, the shiftable panel is disengaged from the press if latch means are used, and the panel with die retracted onto the platform ready for vehicular transport. However if further die shift onto the panel S is required, before transport, a choice of further manipulative steps is possible depending upon the die dimension in the direction of shifting.

Thus where the maximum initial shift of a die has brought the back or trailing edge well onto the shiftable panel, the blocks B with posts A removed are returned under the die to the back side, and posts A are replaced as abutments to engage and move the die further on a second advance of the blocks B. By another procedure, for example where the die center of gravity is already safely over the shiftable panel S, the latter is retracted, even so far as to project at the other side of the truck if necessary, carrying the die further onto the truck platform. Then the die may be secured relative to the vehicle by cables to posts 16 inserted as needed, and panel S is shifted back to normal central position relative to the platform. A repetition of these steps or combinations thereof may be used in particular circumstances.

Where the reverse process or procedure is in question, i.e., for die unloading from the truck, by vehicular movement the truck is brought into substantially parallel relation to the external load locus; and by such vertical movements of carriage C and lateral shift of the structure S as may be required the relations of FIG. 3 are established with the level of the load supporting surface of S and of 10 substantially equal. With pins A then appropriately positioned as pusher abutments, the blocks B are advanced to push the load D toward desired situs. Where the extreme movement of blocks B, ergo pins A, as is usually the case, does not carry the load to desired final position, the blocks B are retracted to permit dropping of arms L as load engaging members which upon advance of blocks B, then shove the die load into desired place. With independently controlled movement of blocks B, there is the obvious advantage that the load may be shifted also in a rotational or angular sense, to direct it to final desired orientation relative to its external situs, thereby avoiding need of preliminary "jockeying" of the vehicle to precise parallelism. In some cases because of the bulk of the die, it may be so situated on the shiftable panel S that the blocks B are entirely covered rendering use of pins A as initial load moving abutments impossible for unloading, in which case, resort may be had to the previously mentioned procedure of lashing to pins 16 suitably placed, and then sliding the panel structure S under the die to expose blocks B for placement of pin A therein. This step may be useful too where a load, accepted from one side of the truck and not central on the platform, covers the blocks B, when brought to position for use in a die pushing movement to unload at the other side.

Detailed structure and mechanism for the shiftable panel structure S and its associated devices are now considered. The shiftable structure S may include a shallow box-like generally rectangular structure, formed of welded plates including left and right end plates 21, a top plate 22 providing a direct load contacting supporting horizontal surface, and front and rear side plates with a top-edge rabbet 23, or equivalent structures. Suitable transverse slideway formations are provided on the platform frame for engaging at least the bottom and side areas immediately adjacent the bottom transverse corners of S; while corresponding front and rear transverse elongated cover plates 25 secured to the platform P engage the transverse rabbets of side plates 23.

Double acting hydraulic cylinder units, disposed within the frame of platform P along the transverse sides of S, each include a cylinder 26 pinned or pivotally secured at one end to the frame of platform P and having a piston connected by a piston rod 27 to a projecting lug or plate 28 from structure S. The lugs 28 conveniently are on the same side of carriage C near the extreme lateral end of S, the cylinder units being so dimensioned that lug 28 may move in toward the cylinder or outward beyond the adjacent side of carriage C in about equal distances, for shifting S from a central location to one side or the other of the platform or carriage.

Since both cylinder units are intended to operate simultaneously in shifting the structure S evenly, without cocking or binding, hydraulic fluid is simultaneously exhausted from a corresponding selected one end of each cylinder, and hydraulic fluid under pressure admitted to the other end of each cylinder for shifting S to one side of the truck, with reversal of the pressurizing and venting of the cylinders for shift in the opposite direction. The cylinders therefore are connected in parallel in a known type of hydraulic circuit including a fluid reservoir, a suitably powered pump, and a shift control valve for selectively connecting corresponding ends of the cylinders to the pump and exhausting the other ends to the reservoir for shift in one direction; and for reversing the cylinder connections relative to pump and reservoir for shift in the opposite direction, with a neutral valve point for stopping fluid flow relative to the cylinders to maintain a selected position of S, with the pump by-passed to the reservoir by a pressure relief valve or the like.

Suitable mechanism for mounting and shifting each block B is shown in detail in FIGS. 5, 6, 7, here including a hydraulically powered motion multiplying system. Each block B is longitudinally bored and provided with a suitable antifriction means as lubricated bushing 31 for sliding on a support and guide rod 32, supported endwise by clamping pillow blocks 33 secured at the end plates 21 of the shiftable panel S. The surface 22 of S is transversely slotted above each rod 32, that is the plates forming surface 22 are spaced to form a transverse slot above 32 to accommodate and guide the top of block B, and pins A received therein, the top of B being preferably slightly lower than surface 22 to ensure clearance for passing under a load. The block B, centrally and at opposite ends, is provided with spaced vertical apertures 35 for reception of the reduced ends of pins A.

Spaced from and parallel to rod 32, there is a double acting hydraulic cylinder unit having a cylinder 37 secured at one end in the frame of structure S adjacent a side plate 23 and a piston connected through the piston rod to a sprocket or sheave yoke 39 which is supported and guided by an underlying shiftable frame plate element 40. The yoke 39 includes rigidly spaced top and bottom plates or arms 39a, 39b between which are rotatably mounted paired sets of chain sprockets or sheaves 41, 42. Outboard of opposite ends of a separating vertical frame plate 43 are fixed sprockets or sheaves 44, 45, having vertical axes parallel to those of 41, 42. A 2/1 motion multiplying connection between the piston of the hydraulic unit and block B, whereby a cylinder unit within the confines of structure S is effective to move block B from one side of S to the other, is provided by bolt-like chain means including lengths 47a, 47b each having an end secured relative to the frame of S, respective opposite ends secured in lateral endwise slots at opposite ends of block B, and the lengths passing around sheaves 41, 44 and 42, 45 respectively. One length is secured by an adjustable anchor bolt as at 48. The three apertures in B then, plus manual shifting of pins A then permit a force application to a load by a pin over practically the entire width of S.

In this case, for flexibility in load manipulation, it is preferable that the cylinder units actuating blocks B should be independently controlled for independent movement. Accordingly, each unit would be provided with a fluid reversing valve of the character described for units 26, although of course, a common pump and reservoir could be used for both such valves and cylinders.

I claim:

1. A side loading industrial truck comprising: a dirigible automotive vehicle; a load receiving platform structure including a platform frame and a horizontally extended top surface defining a load receiving space of the truck; a shiftable section transversely slidably mounted in the frame for shifting from a centered retracted position to laterally extended positions on either side of the frame, said section providing a longitudinally and transversely extended horizontal load supporting surface; hydraulic cylinder means mounted transversely in said frame at each side of said section for shifting the same; said section having a pair of spaced parallel slots across said load supporting surface; a slide member in each said slot; a guide bar parallel to each said slot beneath a respective said surface for said member; a double acting hydraulic cylinder unit beneath said surface for each said member having a fixed element reacting on said section and a movable element; and motion multiplying connection means between each said movable element and a respective said slide member for shifting the member across said section; said connection means including a first and second movable sheave carried on the end of said movable element, a first and second fixed sheave located in spaced relation to each other near respective opposite ends of said slot, and two flexible inextensible elements, each flexible element being anchored at one end to the slide member, at the other end fixed relative to the section, and passed respectively around said first and said second sheaves.

2. In a truck as described in claim 1 latching means carried by said section on lateral margins and engageable with an upwardly projecting element of an external load site whereby relative separating motion between vehicle and site is inhibited.

3. A side loading industrial truck comprising: a dirigible automobile vehicle; a vertically shiftable load platform structure including a platform frame; a shiftable section transversely slidably mounted in the frame for shifting from a centered retracted position to laterally extended positions on either side of the frame, said section providing a longitudinally and transversely extended horizontal load supporting surface; hydraulic cylinder means mounted transversely in said frame at each side of said section for shifting the same; said section having a pair of spaced parallel slots across said load supporting surface; a slide member in each said slot; double acting hydraulic cylinder units beneath said surface each having a fixed element reacting on said section and a movable element; and motion multiplying connections between respective said movable elements and corresponding said slide members for shifting said members across said section; said units being independently operable for independently moving said members.

4. A side loading industrial truck comprising: a dirigible automotive vehicle; a load platform structure including a platform frame; a shiftable section in the platform structure transversely slidably mounted in the frame for shifting from a centered retracted position to laterally extended positions on either side of the frame, said section providing a longitudinally and transversely extended horizontal load supporting surface; hydraulic cylinder means mounted transversely in said frame at each side of said section for shifting the same; said section having a pair of spaced parallel slots across said load supporting surface; a slide member in each said slot; a pair of independently controlled double acting hydraulic cylinder units beneath said surface each having a fixed element reacting on said section and a movable element; and a motion multiplying connection for each said movable element and a corresponding said slide member for shifting said member across said section; each said slide member lying entirely below said surface, and having a longitudinally spaced plurality of vertical apertures; and removable abutment posts receivable in said apertures to project above said surface for load engaging or anchoring purposes.

5. A truck as described in claim 4, wherein on each side margin of the platform structure there is provided a pair of apertures formed in fixed portions of the platform adjacent the shiftable section, and a pair of removable fixed abutment members selectively located in one pair of said apertures.

References Cited in the file of this patent

UNITED STATES PATENTS

| | | |
|---|---|---|
| 1,896,543 | Gfrorer | Feb. 7, 1933 |
| 2,633,809 | Robinson et al. | Apr. 7, 1953 |
| 2,756,885 | Ackermann | July 31, 1956 |
| 2,811,240 | Fenton | Oct. 29, 1957 |
| 2,880,897 | Wilms et al. | Apr. 7, 1959 |

UNITED STATES PATENT OFFICE

CERTIFICATE OF CORRECTION

Patent No. 2,987,205                                  June 6, 1961

John A. Draxler

It is hereby certified that error appears in the above numbered patent requiring correction and that the said Letters Patent should read as corrected below.

Column 1, line 28, for "asiles" read -- aisles --; column 3, line 21, for "arm" read -- arms --; column 6, line 31, for "a respective said surface for said member" read -- said surface for a respective said member --.

Signed and sealed this 21st day of November 1961.

(SEAL)
Attest:

ERNEST W. SWIDER
Attesting Officer

DAVID L. LADD
Commissioner of Patents
USCOMM-DC